L. G. SHREVE.
TIRE SUPPORT.
APPLICATION FILED JULY 19, 1916.
1,209,770.
Patented Dec. 26, 1916.
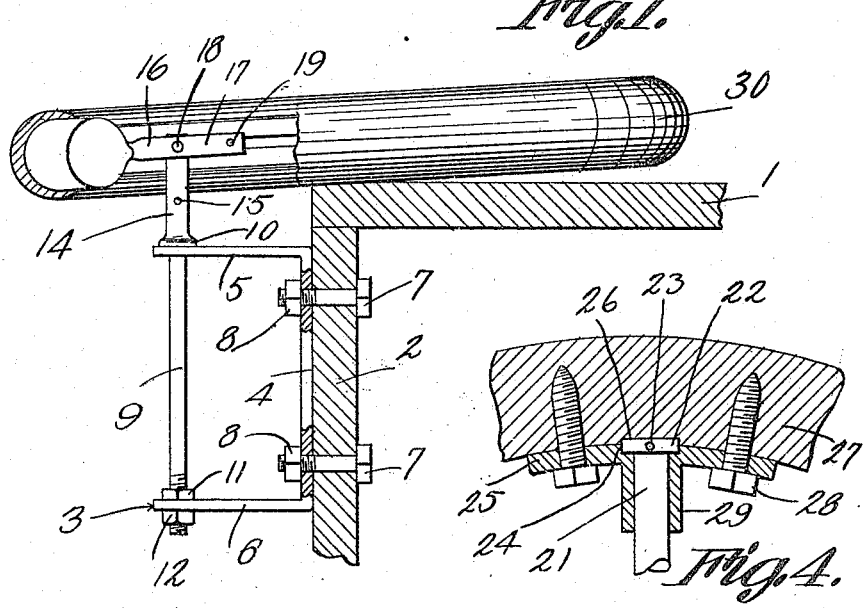
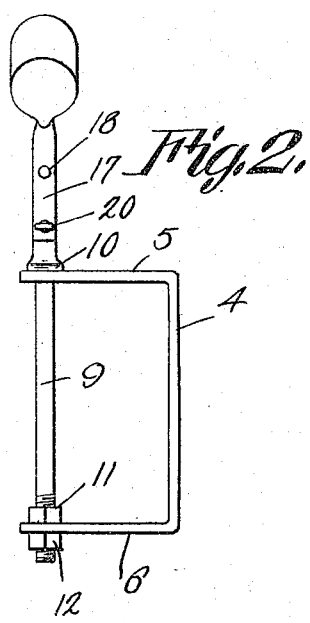
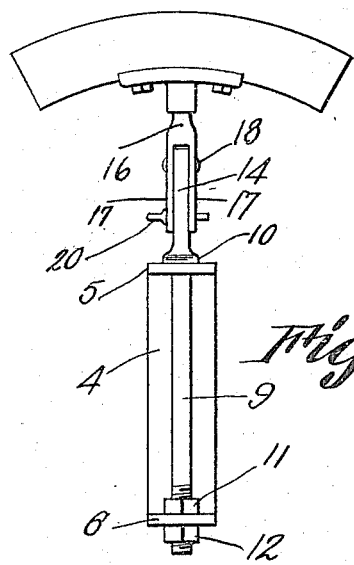
Witnesses
L. G. Shreve, Inventor
by Attorneys

UNITED STATES PATENT OFFICE.

LEONARD G. SHREVE, OF IOWA CITY, IOWA.

TIRE-SUPPORT.

1,209,770.

Specification of Letters Patent.  Patented Dec. 26, 1916.

Application filed July 19, 1916. Serial No. 110,155.

*To all whom it may concern:*

Be it known that I, LEONARD G. SHREVE, a citizen of the United States, residing at Iowa City, in the county of Johnson and State of Iowa, have invented a new and useful Tire-Support, of which the following is a specification.

The device forming the subject matter of this application is adapted to support a tire while the tire is being stripped, repaired or built up.

The invention aims to provide a device of this type which may be manipulated with respect to a work bench, so as to dispose the tire which is being worked upon, in proper relation to the work bench, and in convenient relation to the operator.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings: Figure 1 shows in side elevation, a tire support constructed in accordance with the present invention, a portion of a work bench and a portion of a tire appearing in section; Fig. 2 is a view showing the tire support in elevation, parts thereof being arranged in a manner differing slightly from the disclosure of Fig. 1; Fig. 3 is an elevation wherein the tire support is viewed at right angles to the showing of Fig. 2; Fig. 4 is a fragmental section taken through the mandrel and attendant parts, certain elements appearing in elevation.

The numeral 1 indicates the top of a work bench comprising a side 2.

In carrying out the present invention there is provided a U-shaped bracket 3 including a base 4, an outstanding upper arm 5 and an outstanding lower arm 6. By means of securing elements 7, which may be bolts, the base 4 of the bracket 3 is secured in a vertical position to the side 2 of the work bench. The nuts 8 on the bolts 7 preferably engage the base 4 of the bracket, and the heads of the bolts 7 engage the inner face of the side 2 of the work bench. The bracket 3, however, may be secured to the work bench in any other desired way.

Journaled for rotation in the arms 5 and 6 of the bracket 3 is a vertical standard 9. The standard 9 may be provided with a shoulder 10 which, engaging the upper arm 5 of the bracket, serves to limit the downward movement of the standard. Threaded onto the standard 9 is an upper nut 11. The upper nut 11 engages the upper face of the lower arm 6 of the bracket and coöperates with the shoulder 10, to some extent, in limiting the downward movement of the standard 9. Threaded onto the lower end of the standard 9 is a nut 12. If it is desired to hold the standard 9 against rotation, then the nut 12 is tightened up until the lower arm 6 is bound between the nuts 11 and 12, or, if the nut 11 should be raised so that it does not engage the lower arm 6, then the upper arm 5 of the bracket will be engaged by the shoulder 10, and the lower arm 6 of the bracket will be engaged by the lower nut 12, thus holding the standard 9 against rotation. Above the shoulder 10, the standard 9 is supplied with a flattened extension 14 having an opening 15.

The numeral 16 designates a support including side arms 17. The flattened extension 14 of the standard 9 is received between the side arms 17. A pivot element 18 connects the side arms 17 of the support 16 with the upper end of the flattened extension 14, the construction being such that the support 16 may swing in a vertical plane. The side arms 17 of the support 16 are provided with openings 19. The openings 19, and the opening 15 in the flattened extension 14 of the standard 9 lie in a circumference the center of which is the pivot element 18. Consequently, the openings 19 and 15 may be brought to coaxial relation. A pin 20 may be thrust through the openings 15 and 19 when these openings are alined. In this manner, the support 16 may be held in a vertical position, as shown in Fig. 2, but, when the pin 20 is removed, the support 16 may be swung over into a horizontal position as shown in Fig. 1. The support 16 terminates in a neck 21 which is of circular cross section. Mounted on the end of the neck 21 removably is a circular head 22 held in place on the neck by a securing element 23 which may be a pin or screw. The head 22 is received in a recess 24 formed in a bracket 25. The head 22 is also received in the recess 26 formed in a mandrel 27. The head 22 is adapted to rotate in the recesses 24 and 26. By means of securing elements 28, which may be screws, the bracket 25 is attached to the mandrel 27. The bracket 25 includes a socket 29 in which the neck 21 of the support 16 is journaled. In practical operation, a tire 30 is saddled on the mandrel 27. The pin 20 is removed, whereupon the support 16 may be tilted into a horizontal position, as indicated in Fig. 1, the tire 30 under such circumstances resting on the bench. If desired, however, the support 16 may be disposed vertically, as shown in Fig. 2, the pin 20 being thrust through openings 19 and 15, to hold the support 16 in vertical alinement with the standard 9. Under such circumstances, the tire 30 is upheld in a substantially vertical plane. The standard 9 may be permitted to rotate in the arms 5 and 6, or it may be held against rotation, by tightening up the nuts 11 and 12, or one of them. Further, as Fig. 4 will clearly show, the mandrel 17 may be rotated on the support 16. Owing to the presence of the head 22 on the support, the mandrel 27 cannot be detached accidentally from the support. In assembling the mandrel with the support, the neck 21 of the support is thrust through the socket 29 and the head 22 is then mounted on the neck 21 and attached thereto by the securing element 23. The bracket 25 is then attached to the mandrel 27 by the screws 28. As the head 25 is engaged in the recess 24 of the bracket 25 and in the recess 26 of the mandrel 27, the head aids in holding the mandrel 27 on the support 26 against sliding movement, should the screws 28 become loose, some of the strain on the screws being removed, owing to the construction above outlined.

Having thus described the invention, what is claimed is:—

1. In a device of the class described, a bracket; a standard carried by the bracket; a support mounted to tilt on the standard; a tire mandrel carried by the support; and means for holding the support against tilting movement with respect to the standard.

2. In a device of the class described, a bracket; a standard journaled in the bracket; a support mounted to tilt on the standard; a tire mandrel carried by the support; and means for holding the support against tilting movement with respect to the standard.

3. In a device of the class described, a bracket; a standard carried by the bracket; a support mounted to tilt on the standard; a tire mandrel journaled for rotation on the support; and means for holding the support against tilting movement with respect to the standard.

4. In a device of the class described, a bracket; a standard journaled in the bracket; a support mounted to tilt on the standard; a tire mandrel journaled on the support; and means for holding the support against tilting movement with respect to the standard.

5. In a device of the class described, a bracket; a standard journaled for rotation in the bracket; means for holding the standard against rotation with respect to the bracket; a support mounted to tilt on the standard; a tire mandrel carried by the support; and means for holding the support against tilting movement with respect to the standard.

6. In a device of the class described, a bracket; a standard journaled for rotation in the bracket; means for holding the standard against rotation with respect to the bracket; a support mounted to tilt on the standard; a tire mandrel journaled on the support; and means for holding the support against tilting movement with respect to the standard.

7. The combination with a bench including a substantially horizontal top and a substantially vertical side, of a bracket secured to the side and outstanding therefrom; a substantially vertical standard journaled for rotation in the bracket; means for holding the standard against rotation with respect to the bracket; a support mounted to tilt on the upper end of the standard, to dispose the support in approximate parallelism with the top of the bench; securing means for uniting the support detachably with the standard to hold the support in vertical alinement with the standard; and a tire mandrel journaled on the support.

8. The combination with a work bench including a substantially horizontal top and a substantially vertical side, of a bracket secured to said side and projecting outwardly therefrom; an upright standard journaled in the bracket; a support pivoted to the upper end of the standard for tilting movement, whereby the support may be disposed in approximate parallelism to the top of the bench; means for holding the support against tilting movement; and a mandrel journaled on one end of the support.

9. In a device of the class described, the combination with a work bench including a substantially horizontal top and a substantially vertical side, of a bracket projecting outwardly from said side; a standard carried by the bracket; a support pivoted to the upper end of the standard, whereby the support may be disposed in approximate parallelism to the top of the bench; means for holding the support against tilting movement with respect to the standard; and a tire mandrel mounted on the upper end of the support.

10. In a device of the class described, a U-shaped bracket comprising arms; a standard journaled in the arms and provided with a shoulder engaging one arm; a clamping device on the standard and coacting with the other arm to hold the standard against rotation, at the will of an operator; a support fulcrumed intermediate its ends on the standard, one end of the support and the standard being provided with openings adapted to be brought into registration; a pin adapted to be inserted into said openings when the openings are in registration; and a tire mandrel mounted on the other end of the support.

11. In a device of the class described, a substantially U-shaped bracket embodying spaced arms; a standard journaled for rotation in said arms; nuts threaded onto the standard and adapted to engage opposed faces of one of the arms, to hold the standard against rotation and to provide for a longitudinal adjustment of the standard; a support fulcrumed intermediate its ends on the standard, one end of the support and the standard being provided with openings adapted to be brought into registration; a pin adapted to be inserted into said openings; and a tire mandrel carried by the other end of the support.

In testimony that I claim the foregoing as my own, I have hereto affixed my signature in the presence of two witnesses.

LEONARD G. SHREVE.

Witnesses:
C. B. CRAIN,
J. A. SHALLA.

Copies of this patent may be obtained for five cents each, by addressing the "Commissioner of Patents, Washington, D. C."